United States Patent
Borenstein

(10) Patent No.: US 7,331,237 B2
(45) Date of Patent: Feb. 19, 2008

(54) TECHNIQUE FOR IMPROVING PIRANI GAUGE TEMPERATURE COMPENSATION OVER ITS FULL PRESSURE RANGE

(75) Inventor: Michael D. Borenstein, Boulder, CO (US)

(73) Assignee: Brooks Automation, Inc., Chelmsford, MA (US)

(*) Notice: Subject to any disclaimer, the term of this patent is extended or adjusted under 35 U.S.C. 154(b) by 13 days.

(21) Appl. No.: 11/344,959

(22) Filed: Feb. 1, 2006

(65) Prior Publication Data
US 2007/0186658 A1   Aug. 16, 2007

(51) Int. Cl.
G01L 19/04 (2006.01)
(52) U.S. Cl. ........................................ 73/708
(58) Field of Classification Search .................. 73/755, 73/719, 725, 734, 753
See application file for complete search history.

(56) References Cited

U.S. PATENT DOCUMENTS

| | | | |
|---|---|---|---|
| 4,174,639 | A | 11/1979 | Raven |
| 4,729,242 | A | 3/1988 | Reich et al. |
| 5,557,972 | A | 9/1996 | Jacobs et al. |
| 5,608,168 | A | 3/1997 | Schoroth |
| 5,642,278 | A * | 6/1997 | Wang et al. ............... 700/29 |
| 5,668,320 | A | 9/1997 | Cowan |
| 5,693,888 | A | 12/1997 | Enderes et al. |
| 5,867,031 | A * | 2/1999 | Wang ........................ 324/721 |
| 5,877,423 | A | 3/1999 | Mattsson |
| 6,023,979 | A * | 2/2000 | Bills et al. ................ 73/755 |
| 6,227,056 | B1 | 5/2001 | Bills et al. |
| 6,227,956 | B1 * | 5/2001 | Halley ..................... 451/288 |
| 6,474,172 | B1 | 11/2002 | Rolff et al. |
| 6,658,941 | B1 * | 12/2003 | Bills et al. ................ 73/755 |
| 6,799,468 | B2 * | 10/2004 | Borenstein ................ 73/755 |
| 6,865,952 | B2 * | 3/2005 | Bills et al. ................ 73/755 |
| 6,945,119 | B2 * | 9/2005 | Bills et al. ................ 73/755 |
| 2003/0097876 | A1 | 5/2003 | Bills et al. |
| 2004/0020301 | A1 | 2/2004 | Borenstein |
| 2006/0021442 | A1 * | 2/2006 | Borenstein et al. ........... 73/708 |
| 2006/0021444 | A1 * | 2/2006 | Borenstein ................ 73/755 |

FOREIGN PATENT DOCUMENTS

DE        42 05 551 A1   2/1992

* cited by examiner

Primary Examiner—Andre J. Allen
(74) Attorney, Agent, or Firm—Hamilton, Brook, Smith & Reynolds, P.C.

(57) ABSTRACT

A method and apparatus are provided for achieving nearly perfect temperature compensation of a heat-loss vacuum gauge over its full pressure range. A voltage is measured across a sensor leg, a sensor leg and a temperature compensating leg connected together in series, or a sensor leg and a fixed resistive leg coupled together in series. A voltage is also measured across a subleg of the temperature compensating leg. The temperature compensating leg may include a temperature sensitive subleg and a temperature stable subleg connected together in series. The sublegs may include one or more temperature sensitive and/or temperature stable elements. The measured voltages are combined to produce temperature independent pressure indications over a pressure range. Three-dimensional curve-fitting or similar techniques may be used to combine the measured voltages.

25 Claims, 9 Drawing Sheets

TECHNIQUE FOR IMPROVING PIRANI GAUGE TEMPERATURE COMPENSATION OVER ITS FULL PRESSURE RANGE

BACKGROUND OF THE INVENTION

A heat-loss vacuum gauge may be used to determine gas pressure in an environment by measuring heat transfer rates from a heated sensing element to the gas under certain conditions. In a Pirani-type heat-loss vacuum gauge ("Pirani gauge"), heat transfer rates are measured using a Wheatstone bridge network, which serves both to heat the sensing element and to measure its resistance to obtain a pressure indication.

FIG. 1A shows a simplified schematic diagram of a Wheatstone bridge network of a Pirani gauge. The Pirani gauge includes a temperature sensitive element RS connected between nodes B and C forming a temperature sensitive leg of the Wheatstone bridge. R2 is typically a temperature sensitive resistance designed to have a negligible temperature rise due to a current $i_2$. R2 may include resistances R and RC connected in series between nodes C and D forming a temperature compensating leg of the Wheatstone bridge. R3 and R4 are typically fixed resistances. RS and typically RC are exposed to the vacuum environment (indicated by the dashed box) whose pressure is to be measured. FIG. 1B shows an alternative Wheatstone bridge configuration.

Voltage $V_B$ is automatically controlled to maintain the voltage difference between nodes A and C at zero volts. When the potential drop from A to C is zero, the Wheatstone bridge is said to be balanced. Referring again to FIG. 1A, at bridge balance the following conditions exist:

$$i_S = i_2, \quad (1)$$

$$i_4 = i_3, \quad (2)$$

$$i_S RS = i_4 R4, \quad (3)$$

and $$i_2 R2 = i_3 R3. \quad (4)$$

Dividing Eq. (3) by Eq. (4) and using Eqs. (1) and (2) gives $$RS = \beta R2, \quad (5)$$

where $$\beta = \frac{R4}{R3}. \quad (6)$$

Thus, at bridge balance RS is a constant fraction $\beta$ of R2.

To achieve a steady state condition in RS at any given pressure, Eq. (7) below must be satisfied:

Electrical power input to $RS$ =

Power radiated by $RS$ + Power conducted away from $RS$ through its mechanical supports + Power lost to gas by $RS$ (7)

A conventional Pirani gauge is calibrated against several known pressures to determine a relationship between unknown pressure, $P_x$, and the power lost to the gas. Then, assuming RS mechanical conduction and radiation losses remain constant, the unknown pressure of the gas, $P_x$, may be directly determined by the power lost to the gas or related to the bridge voltage at bridge balance.

The Pirani gauges shown in FIGS. 1A and 1B, however, suffer from ambient temperature-caused errors. All of the heat loss terms in Eq. (7) are dependent on ambient temperature and on sensing element RS temperature at any given pressure.

Any attempt at pressure measurement with a Pirani gauge without temperature correction will be confused for non-pressure dependent power losses caused by changes in ambient temperature. Thus, all modern Pirani gauges attempt to correct for errors caused by ambient temperature changes.

It has long been known to use for R2 a compensating element RC, with a similar Temperature Coefficient of Resistance (TCR) as the sensing element, in series with a temperature stable element R. This provides temperature compensation for the changes in cold resistance of the sensor, and changes in all three power losses (Eq. 7) which vary with the temperature difference between the sensing element and its surrounding environment.

This method of temperature compensation assumes that if (1) the temperature coefficients of resistance of the sensing and compensating elements are equal; and (2) the change in sensing element resistance can be made to rise in tandem with change in compensating element resistance, then (3) the temperature of the sensing element will rise in tandem with ambient temperature changes. Satisfying these assumptions is highly desirable, of course, because doing so would assure that the temperature difference between the heated sensing element and the surrounding wall at ambient temperature would remain constant as ambient temperature changes.

However, Pirani gauges which utilize a temperature stable element R in series with a temperature sensitive element RC for R2 provide only partial temperature compensation as will now be explained.

Assume that in FIG. 1A, R2 is composed of a temperature sensitive compensating element RC and a temperature stable element R so that $$R2 = RC + R, \quad (8)$$

Thus, Eq. (5) derived above for bridge balance may be written as $$RS = \beta(RC + R) \quad (9)$$

where $\beta$ is defined by Eq. (6) above.

Further, assume that the sensing element RS operates at temperature $T_{s1}$, and the compensating element RC operates at temperature $T_{C1}$ when the ambient temperature of the gauge environment is equal to $T_1$. Thus, when $$T_{AMBIENT} = T_1, \quad (10)$$

Eq. (9) may be written as $$RS(T_1)(1+\alpha_S(T_{S1}-T_1)) = \beta[RC(T_1)(1+\alpha_C(T_{C1}-T_1)) + R]. \quad (11)$$

Here, $RS(T_1)$ is the resistance of the sensing element RS at temperature $T_1$, $\alpha_S$ is the TCR of RS at $T_1$, $RC(T_1)$ is the resistance of the compensating element RC at temperature $T_1$, and $\alpha_C$ is the TCR of RC at $T_1$. Thus, when $$T_{AMBIENT} = T_2 \qquad (12)$$

Eq. (9) may be written as $$RS(T_1)(1+\alpha_S(T_{S2}-T))=\beta[RC(T_1)(1+\alpha_C(T_{C2}-T_1))+R]. \qquad (13)$$

Solving Eq. (11) for $T_{S1}$ gives $$T_{S1} = \left[\frac{\beta}{RS(T_1)}[RC(T_1)(1+\alpha_C(T_{C1}-T_1))+R]-1\right]/\alpha_S + T_1. \qquad (14)$$

Solving Eq. (13) for $T_{S2}$ gives $$T_{S2} = \left[\frac{\beta}{RS(T_1)}[RC(T_1)(1+\alpha_C(T_{C2}-T_1))+R]-1\right]/\alpha_S + T_1. \qquad (15)$$

Subtracting Eq. (14) from Eq. (15) gives the temperature change $\Delta T$ in the sensing element RS when ambient temperature changes from $T_1$ to $T_2$. Thus, $$\Delta T = T_{S2} - T_{S1} = \beta\left(\frac{RC(T_1)}{RS(T_1)}\right)\left(\frac{\alpha_C}{\alpha_S}\right)(T_{C2}-T_{C1}). \qquad (16)$$

Note that an effective compensating element is designed so that its temperature closely follows ambient temperature. Thus, to a very good approximation, $$T_{C2} - T_2 = T_{C1} - T_1 \qquad (17)$$

or $$T_{C2} - T_{C1} = T_2 - T_1. \qquad (18)$$

Thus, Eq. (16) may be written as $$\Delta T = \beta\left(\frac{RC(T_1)}{RS(T_1)}\right)\left(\frac{\alpha_C}{\alpha_S}\right)(T_2 - T_1). \qquad (19)$$

It is evident from Eq. (19) that the temperature change $\Delta T$ in the sensing element RS will be equal to the change in ambient temperature $T_2-T_1$ only if $$\beta\left(\frac{RC(T_1)}{RS(T_1)}\right)\left(\frac{\alpha_C}{\alpha_S}\right) = 1. \qquad (20)$$

Thus, Pirani gauges using a temperature sensitive compensating element RC in series with a fixed resistance element R for R2 in FIG. 1A provide only partial temperature compensation depending on the choice of β. To further improve temperature compensation, the physical components of the Pirani gauge may be designed to satisfy Eq. 20.

For example, the Temperature Coefficient of Resistance (TCR) and absolute value of the temperature sensitive leg of the Wheatstone bridge may be adjusted (i.e., adjust $\alpha_C$ and R) to satisfy Eq. 20. FIG. 1C shows an alternative Wheatstone bridge configuration that allows for precise adjustments to the TCR and absolute value of the temperature sensitive leg R2. The temperature sensitive leg R2 includes a temperature sensitive section 124 in series with a temperature stable section 122. The temperature sensitive section 124 may include a temperature sensitive resistive element 126 in parallel with one or more fixed resistances and the temperature stable section 222 may include one or more fixed resistances connected in parallel. The voltage between nodes A and C is fed back through amplifier 150 to node B to maintain the voltage across nodes A and C at zero volts.

The TCR and absolute value (ac and R) of the temperature sensitive leg R2 may be precisely adjusted by choosing an appropriate temperature sensitive resistive element 126 and appropriate fixed resistances in sections 122 and 124. By carefully choosing the optimum pressure and two temperatures at which the Pirani gauges are individually compensated, perfect temperature compensation is assured only at one pressure and two temperatures. For example, FIG. 1D graphically illustrates the typical performance of the conventional Pirani heat-loss gauge in which nearly perfect temperature compensation is achieved at about 400 Torr at the temperatures 25° Celsius and 44° Celsius. Even though good temperature compensation is achieved over much of the gauge's pressure range (about ±10% indication error between 5 mTorr and 50 Torr and between 200 Torr and 1000 Torr), there is much room for improvement over most of the gauge's full measurement range, especially below 1 mTorr and between 50 and 200 Torr.

Attempts have been made to improve the overall temperature compensation such as measuring the bridge current and summing the bridge current with the bridge voltage. Again, although this will improve temperature compensation at certain pressures, it does not provide temperature compensation over all pressures.

SUMMARY OF THE INVENTION

A heat-loss gauge is provided that is able to achieve excellent temperature compensation over its full measurement range. The heat-loss gauge includes a sensor leg and a temperature compensating leg. The temperature compensating leg may include a temperature sensitive subleg and a temperature stable subleg. Measuring circuitry is configured to measure voltage (i) across the sensor leg and (ii) across one of the sublegs. Processing circuitry is connected to the measuring circuitry and is configured to combine the measured voltages to produce temperature independent pressure measurements over a pressure range.

The processing circuitry may use three-dimensional curve-fitting techniques to produce the temperature independent pressure measurements over a pressure range. The temperature sensitive subleg may include a temperature sensitive resistive element such as a temperature sensitive coiled resistor. The temperature sensitive subleg may also include one or more temperature stable resistive elements connected in parallel with the temperature sensitive resistive element. The temperature stable subleg may include one or more temperature stable resistive elements connected together in parallel.

In one embodiment, the heat-loss gauge includes a first leg and a second leg connected together in series and a sensor leg and a temperature compensating leg connected together in series. The series combination of the sensor leg and the temperature compensating leg is connected in parallel with the series combination of the first leg and the second leg. The first leg and the second leg may include fixed resistive elements. The temperature compensating leg includes a temperature sensitive subleg and a temperature stable subleg connected together in series. Measuring circuitry measures voltage (i) across the series combination of the sensor leg and the temperature compensating leg and (ii) across one of the sublegs. Processing circuitry, such as a microprocessor, is connected to the measuring circuitry and is configured to combine the measured voltages and produce temperature independent pressure measurements over a pressure range.

In another embodiment, the sensor leg is connected in series with the first leg and the compensating leg is connected in series with the second leg. Moreover, the series combination of the sensor leg and the first leg is connected in parallel with the series combination of the compensating leg and the second leg. In this embodiment, measuring circuitry measures a voltage (i) across the series combination of the sensor leg and the first leg and (ii) across one of the sublegs.

A method is also provided to temperature compensate a heat-loss gauge. According to this method, a voltage across (i) a sensor leg, (ii) a sensor leg and a temperature compensating leg connected together in series, or (iii) a sensor leg and a fixed resistive leg connected together in series is measured. Next, a voltage across a subleg of the temperature compensating leg is measured. Finally, the measured voltages are combined to produce a temperature independent pressure measurement over a pressure range.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
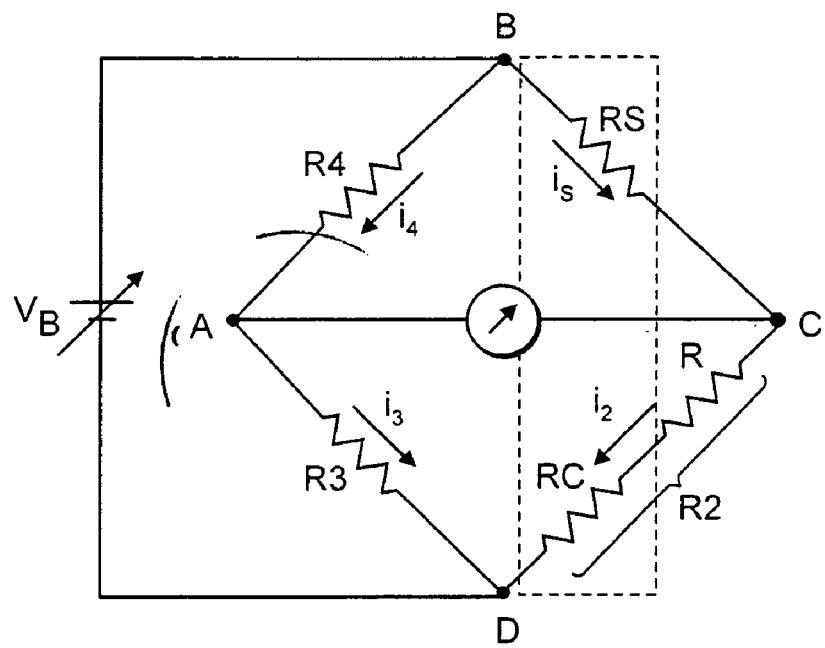
FIGS. 1A-1C are simplified schematic diagrams of conventional Pirani-type heat-loss gauges.
Figure 1B:
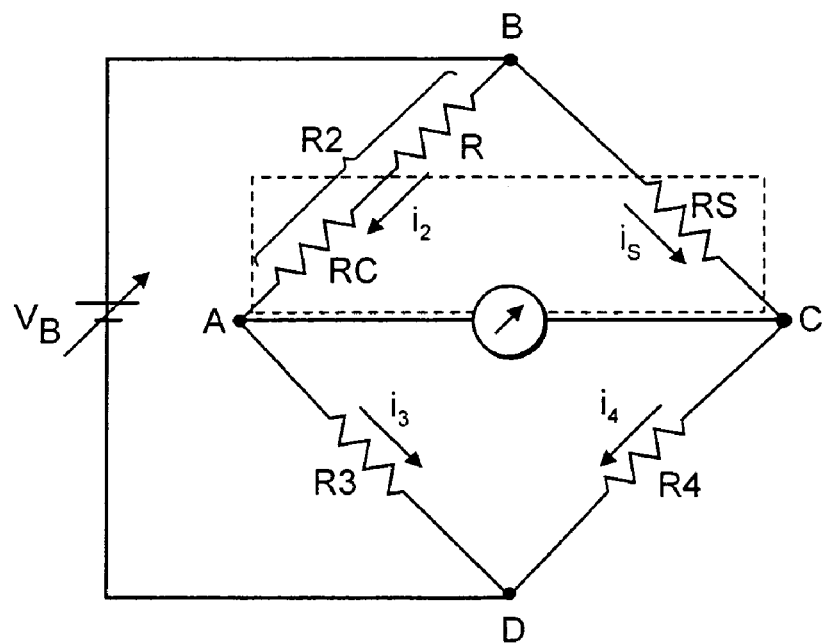
Figure 1C:
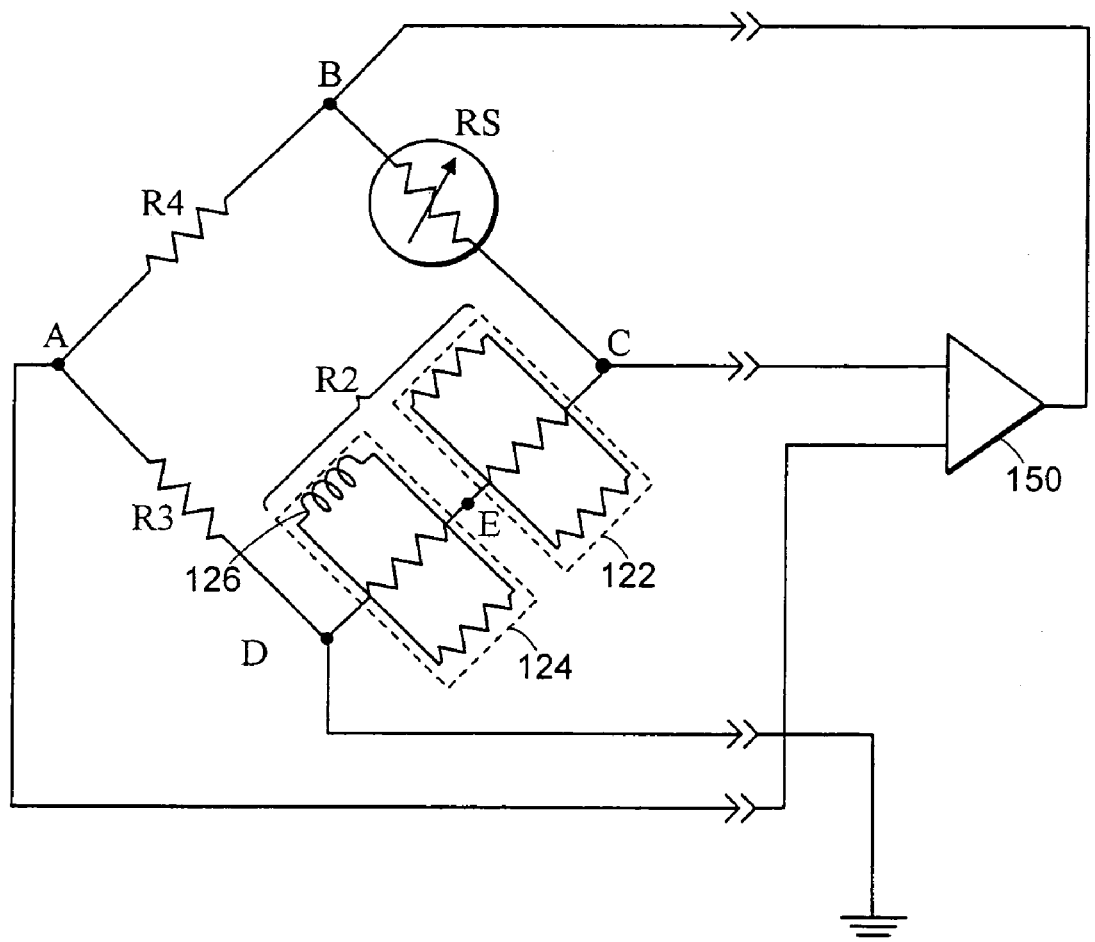
Figure 2:
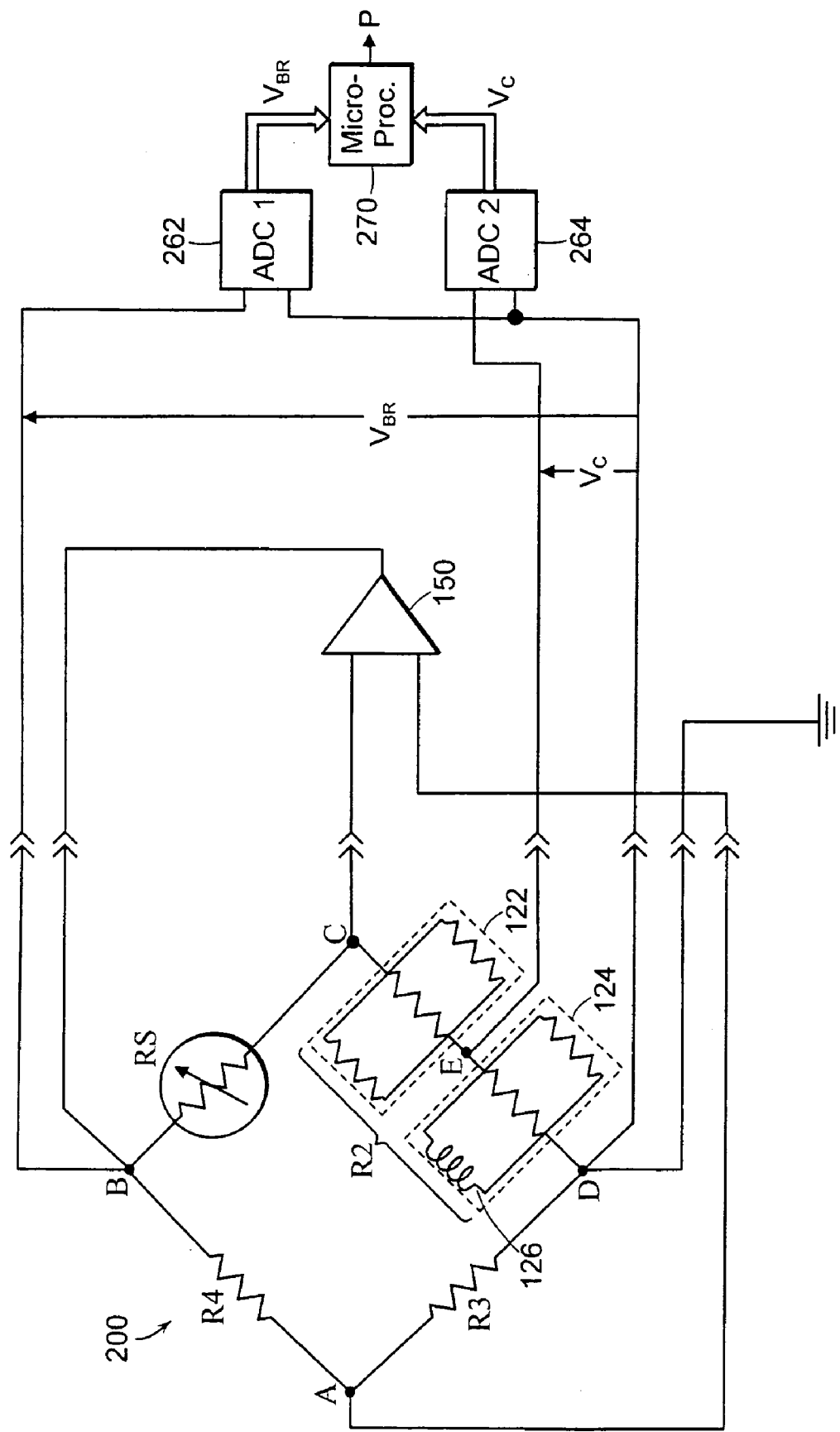
FIG. 2 is a simplified schematic diagram of a heat-loss gauge according to one embodiment of the present invention.

FIG. 2 illustrates a heat-loss gauge 200 according to one embodiment of the present invention. The heat-loss gauge may be implemented using a Wheatstone bridge configuration depicted in FIG. 1C. A first analog-to-digital-converter (ADC) 262 connects to nodes B and D to obtain the value of the overall bridge voltage ($V_{BR}$). The first ADC 262 provides a digital value representing the overall bridge voltage to a microprocessor 270. A second ADC 264 connects to nodes D and E to obtain the value of the voltage across the temperature sensitive section 124 and to provide a digital value representing a compensator junction voltage ($V_C$) to the microprocessor 270.

As the temperature changes at any given pressure, the compensator junction voltage ($V_C$) at the junction of the temperature sensitive and the temperature stable sections 122, 124 will change as a percentage of the total bridge voltage ($V_{BR}$). Thus, the pressure can be represented by an expression (e.g., a polynomial equation) that is a function of both the bridge voltage ($V_{BR}$) and the compensator junction voltage ($V_C$). By using a three-dimensional curve-fitting technique, for example, a set of temperature compensating equations may be generated for various spans of pressure.

Figure 1D:
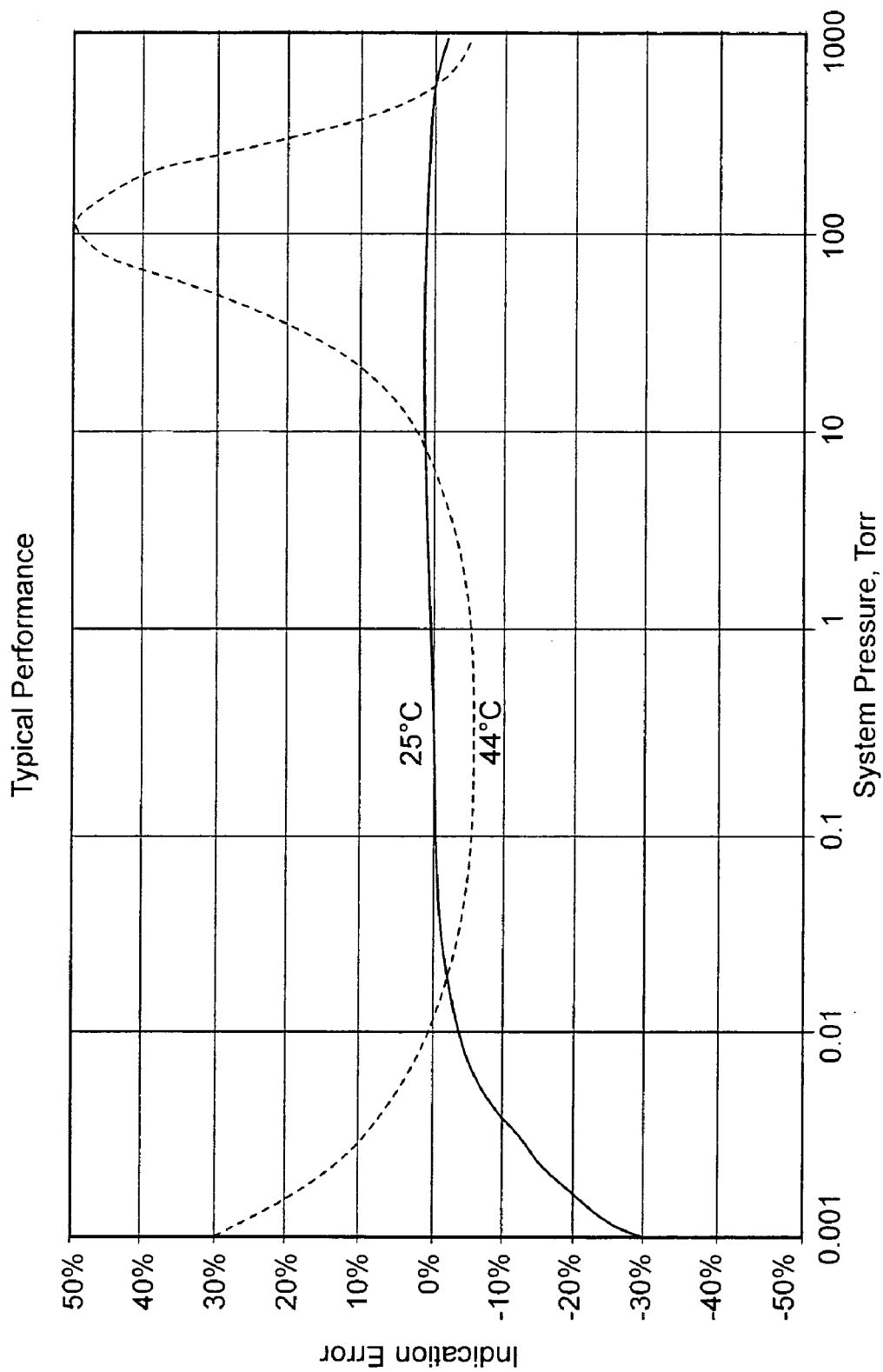
FIG. 1D is a graph illustrating the typical performance of the conventional Pirani heat-loss gauge.

For example, multiple pressures may be measured over multiple temperatures and the measured pressure values may be assembled into a table. Three-dimensional curve-fitting or linear interpolation may be applied to the table of measured pressure values to generate equations. These equations may be used to calculate unique temperature compensated pressure indications in real-time. In this way, nearly perfect temperature compensation may be achieved over all pressures within the full pressure range of the heat-loss gauge. In other words, the indication error curves in the graph of FIG. 1D may be flattened to nearly 0% indication error over a pressure range from 0.001 Torr to 1000 Torr.

Alternatively, a voltage across the temperature stable section 122 may be combined with the overall bridge voltage to provide the same temperature compensation.

Figure 3:
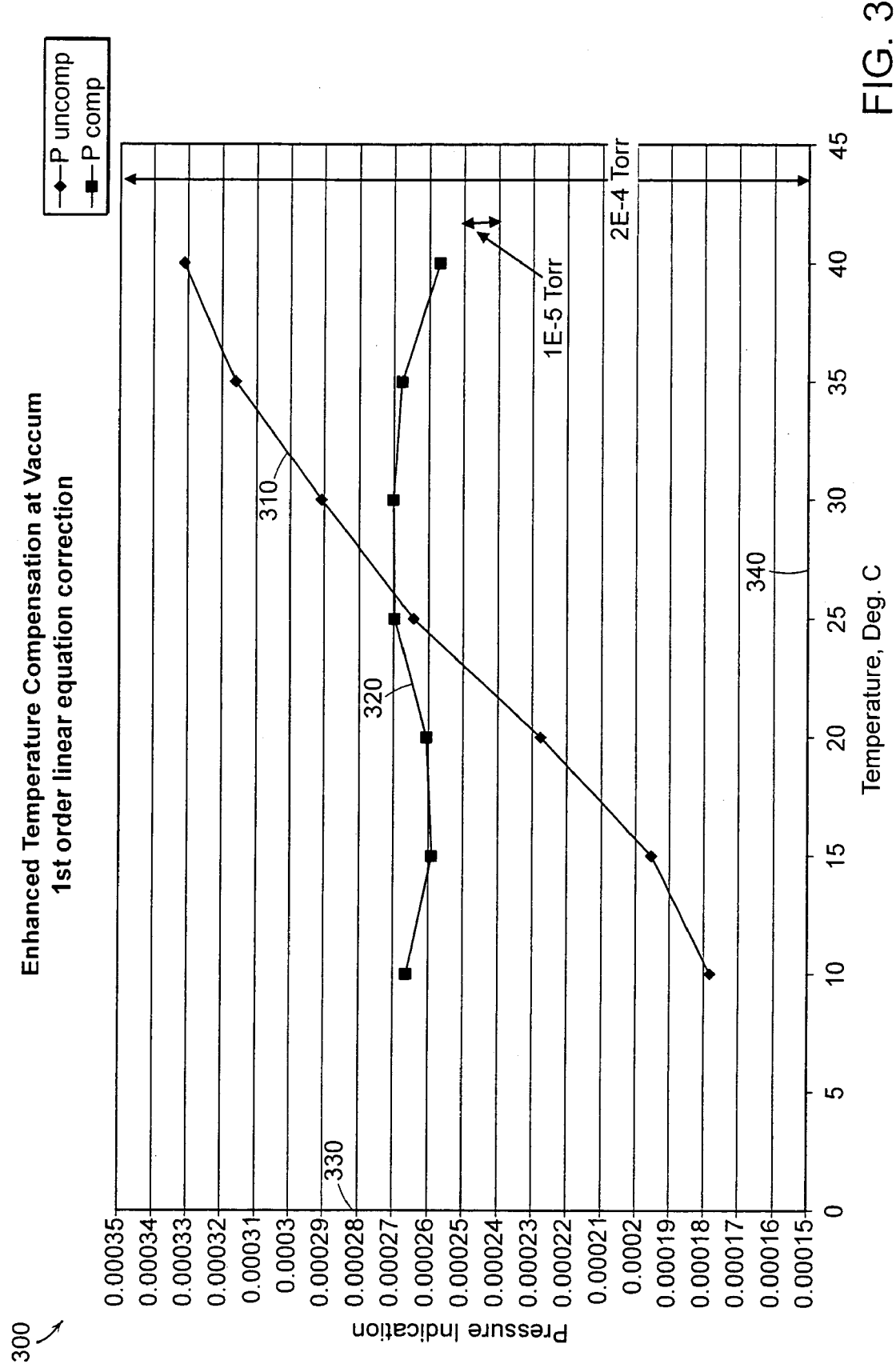
FIG. 3 is a graph illustrating temperature compensation at vacuum using a first order linear equation correction implemented by computer program instructions loaded and executed in the microprocessor of the heat-loss gauge of FIG. 2.

FIG. 3 is a graph illustrating this second order temperature compensation at vacuum 300 using one embodiment of the present invention. FIG. 3 shows the pressure indication 330 of a Pirani gauge across a temperature range 340. As shown, the uncompensated pressure indication 310 varies significantly (0.15 mTorr) between 10° Celsius and 40° Celsius. In contrast, the compensated pressure indication 320, using a first order linear equation correction, varies about 0.01 mTorr over the same temperature range (about one order of magnitude less than the uncompensated pressure indication 310).

Figure 4:
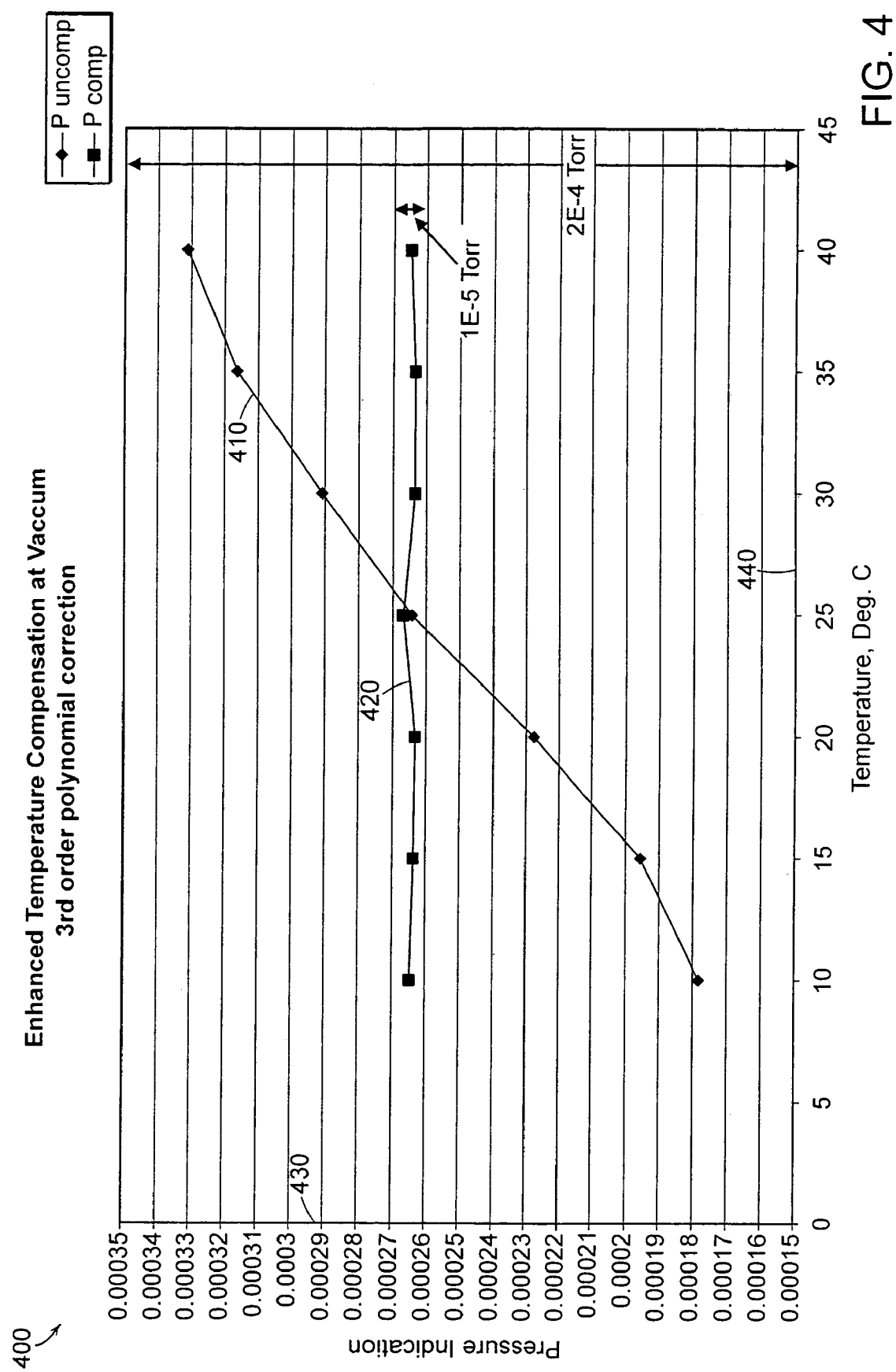
FIG. 4 is a graph illustrating temperature compensation at vacuum using a third order polynomial correction implemented in the microprocessor of the heat-loss gauge of FIG. 2.

FIG. 4 illustrates temperature compensation at vacuum using a third order polynomial correction 400 according to one embodiment of the present invention. Like FIG. 3, FIG. 4 shows the pressure indication 430 of a Pirani gauge across a temperature range 440. Again, the uncompensated pressure indication 410 varies 0.15 mTorr between 10° Celsius and 40° Celsius. In contrast, the compensated pressure indication 420 varies very little (less than 0.005 mTorr) over the same temperature range.

Figure 5:
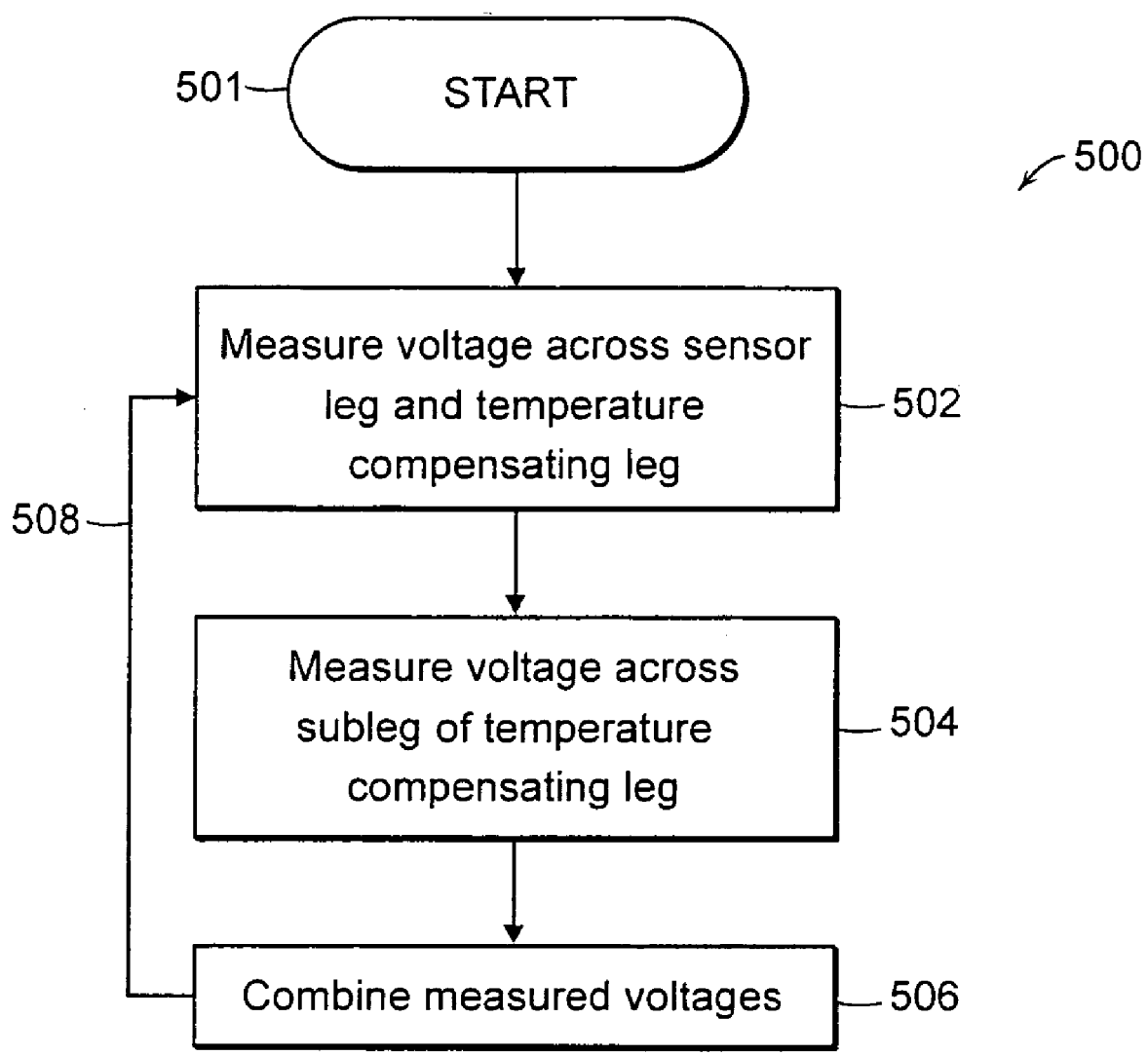
FIG. 5 is a flow chart of a process of temperature compensating a heat-loss gauge according to one embodiment of the present invention.

FIG. 5 is a flow chart of a process for temperature compensating a heat-loss gauge 500 according to one embodiment. In step 501, the process 500 starts. In step 502, the process 500 measures a voltage across a sensor leg and a temperature compensating leg. In step 504, the process 500 measures a voltage across a subleg of the temperature compensating leg. Finally, in step 506, the process 500 combines the measured voltages to obtain a temperature compensated pressure indication. The process 500 then returns 508 to step 502 to once again measure the voltage across the sensor leg and the temperature compensating leg.

Figure 6:
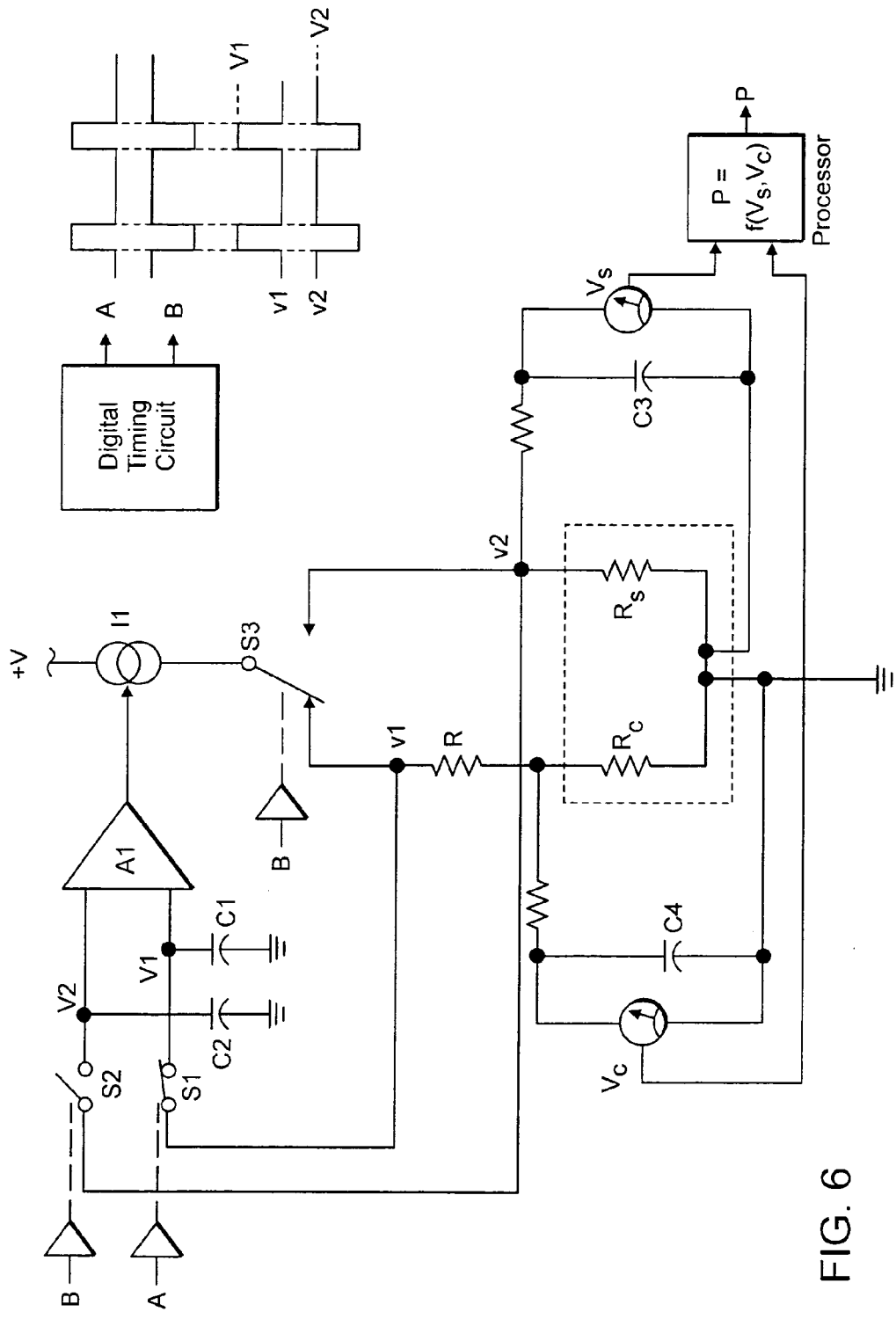
FIG. 6 is a simplified schematic diagram of a heat-loss gauge according to another embodiment of the present invention.

FIG. 6 is a simplified schematic diagram of a heat-loss gauge according to another embodiment of the present invention. In this embodiment, a sensor control circuit causes the temperature of the sensing element $R_S$ to be maintained at a precise fixed amount above the temperature of the compensating element $R_C$. The voltage across the sensing element and/or current through the sensing element required to do this are measured and then converted into a pressure in a manner described in U.S. Pat. Nos. 6,023,979 and 6,658,941 which are incorporated by reference in their entirety. Current from the dependent current source I1 is alternately switched through the sensing element $R_S$ and the compensating element $R_C$ using switch S3. The time during each cycle that the current flows through the sensing element $R_s$ is greater in proportion to the time that the current flows through the compensating element $R_C$. Thus, the average power dissipated in $R_S$ is greater than that dissipated in $R_C$, causing $R_S$ to rise to a higher temperature than $R_C$.

At low pressures heat does not conduct as readily from a resistor to the surrounding environment. As a result, at low pressures, the resistance $R_S$ will increase to a greater amount with a given input, or will require a lesser power input to increase to a given resistance. The extent to which the resistance $R_S$ increases over the resistance $R_C$ is readily determined by connecting a temperature stable differential resistance R in series with $R_C$ and driving the resistance $R_S$ to a level at which $R_S$ equals $R_C$ plus R. The electrical input required to maintain that equality of resistances can then be used to compute pressure. Alternative approaches might, for example, rely on measurements of $R_S$ and $R_C$ that are digitized and processed in a microprocessor without the series resistance R.

The cycle period of this process is kept much shorter than the thermal time constant of the sensor wires so that the temperatures, and therefore the resistances, of the elements do not change as the current is switched back and forth.

A fixed resistor R is inserted in series with $R_C$ to form a sum of a temperature sensitive resistance ($R_C$) and a temperature stable resistance (R). When switch S3 is passing the current from current source I1 through $R_C$, S1 closes and charges capacitor C1 to the peak voltage V1 present at the top of R (signal v1). Then, when S3 switches the current from I1 to $R_S$, S1 opens and S2 closes, charging capacitor C2 to the peak voltage V2 present at the top of $R_S$ (signal v2). Thus, the voltages V1 and V2 are charged to the peak values of signals v1 and v2.

Since the low sides of $R_S$ and $R_C$ are connected together, V1 will equal V2 when the resistance of $R_S=R_C+R$. The difference V1-V2 is amplified in the high-gain integrating amplifier A1 which drives the dependent current source I1 to the proper level to maintain the conditions of equal voltages and equal resistances. The gain of amplifier A1 is sufficiently high to keep the error between V1 and V2 negligible, and the time response of amplifier A1 is slow enough to assure that current source I1 cannot change value during the switching cycle time.

For a steady pressure in the gauge, amplifier A1 holds the current of I1 equal for both parts of the switching cycle. The average voltages across $R_S$ and $R_C$ are developed across C3 and C4, respectively, of RC filters with time constants somewhat longer than the cycle time of the current switching cycle. The average sensing element voltage $V_S$ and compensating element voltage $V_C$ are converted to a digital format using standard A/D conversion techniques. The pressure can be represented by an expression that is a function of both $V_S$ and $V_C$. Thus, a digital processor can calculate pressure as a function of $V_S$ and $V_C$ using a temperature compensating algorithm developed using empirical 3-D surface fitting techniques as described above.

Figure 7:
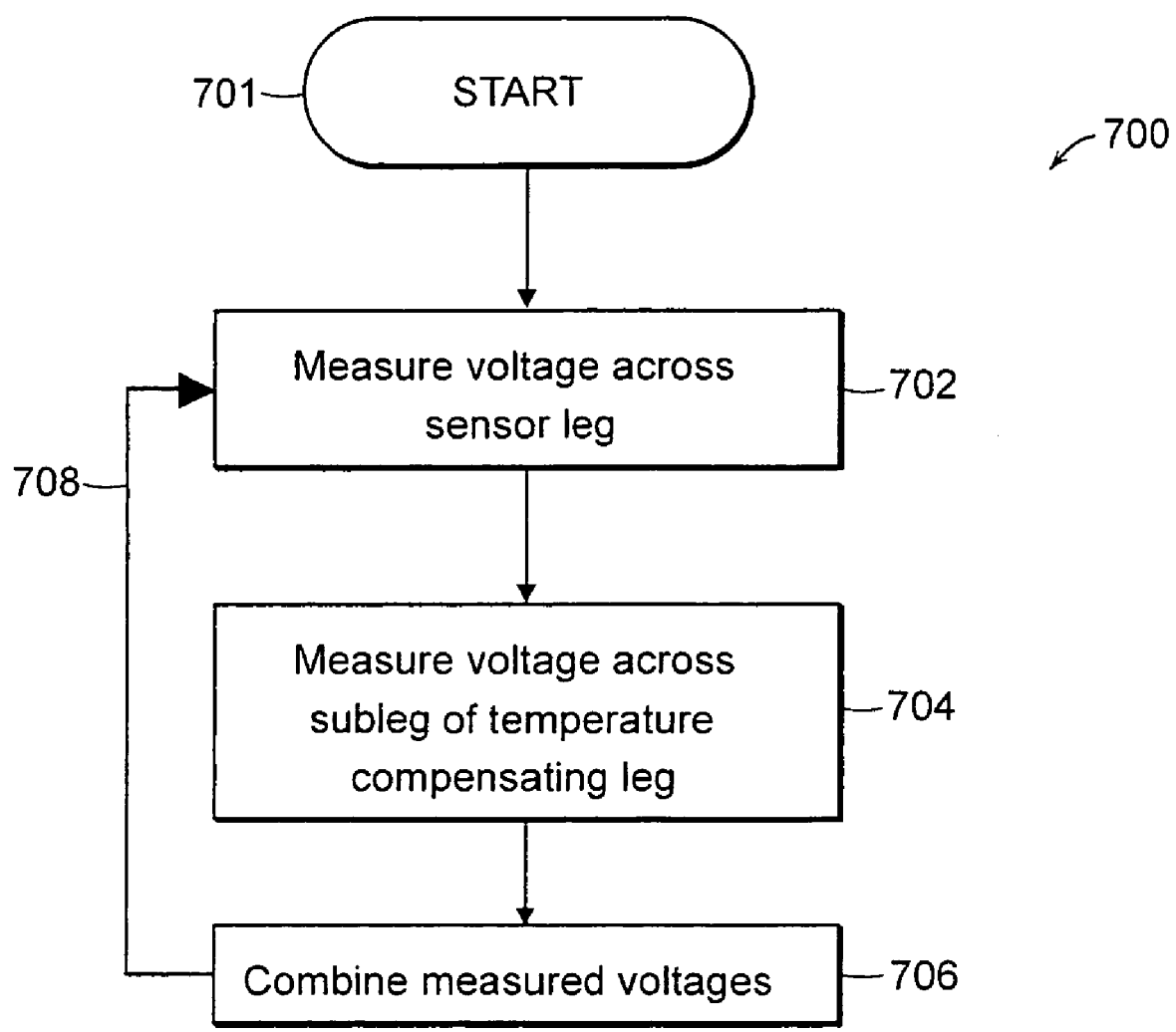
FIG. 7 is a flow chart of a process of temperature compensating a heat-loss gauge according to another embodiment of the present invention.

FIG. 7 is a flow chart of a process of temperature compensating a heat-loss gauge 700 according to another embodiment. In step 701, the process 700 starts. In step 702, the process 700 measures a voltage across a sensor leg and a temperature compensating leg. In step 704, the process 700 measures a voltage across a subleg of the temperature compensating leg. Finally, in step 706, the process 700 combines the measured voltages, then the process 700 returns 708 to step 702 to once again measure the voltage across the sensor leg and the temperature compensating leg.

Using this simple technique, nearly perfect temperature compensation may be achieved across the full measurement range of a heat-loss gauge without calculating a temperature or introducing intermediate steps of deducing temperature. A heat-loss gauge already deployed in the field may easily be retrofitted with electronic components according to embodiments of the present invention to provide this second order temperature compensation over the full measurement range of the heat-loss gauge. Alternatively, the principles of the present invention may be implemented in a new design of a heat-loss gauge.

While this invention has been particularly shown and described with references to preferred embodiments thereof, it will be understood by those skilled in the art that various changes in form and details may be made therein without departing from the scope of the invention encompassed by the appended claims.

It should be understood that this invention may be applied to any heat-loss gauge including a sensor element or leg and a temperature compensating element or leg.

What is claimed is:

1. A heat-loss gauge, comprising:
a sensor leg;
a temperature compensating leg comprising a temperature sensitive subleg and a temperature stable subleg coupled together in series;
measuring circuitry configured to measure voltage (i) across the sensor leg and (ii) across one of the sublegs, and to provide respective measurement signals; and
processing circuitry receiving the measurement signals, and being configured to combine the measurement signals to produce temperature independent pressure measurements.

2. The heat-loss gauge of claim 1 wherein the processing circuitry receiving the measurement signals is further configured to produce temperature independent pressure measurements over a pressure range.

3. The heat-loss gauge of claim 2 wherein the processing circuitry receiving the measurement signals uses three-dimensional curve-fitting techniques to produce temperature independent pressure measurements over a pressure range.

4. The heat-loss gauge of claim 1 wherein the temperature sensitive subleg comprises a temperature sensitive resistive element.

5. The heat-loss gauge of claim 4 wherein the temperature sensitive resistive element is a temperature sensitive coiled resistor.

6. The heat-loss gauge of claim 4 wherein the temperature sensitive subleg further comprises temperature stable resistive elements coupled in parallel with the temperature sensitive resistive element.

7. The heat-loss gauge of claim 4 wherein the temperature stable subleg comprises temperature stable resistive elements coupled together in parallel.

8. The heat-loss gauge of claim 1 wherein the sensor leg and the temperature compensating leg are coupled together in series, further comprising a first leg and a second leg coupled together in series, the series combination of the sensor leg and the temperature compensating leg coupled in parallel with the series combination of the first leg and the second leg.

9. The heat-loss gauge of claim 8 wherein the measuring circuitry is configured to provide the respective measurement signals by measuring voltage (i) across the series combination of the sensor leg and the temperature compensating leg and (ii) across one of the sublegs.

10. The heat-loss gauge of claim 8 wherein the first leg and the second leg comprise fixed resistive elements.

11. The heat-loss gauge of claim 1 further comprising a first leg and a second leg, wherein the sensor leg is coupled in series with the first leg, and the compensating leg is coupled in series with the second leg, the series combination of the sensor leg and the first leg is coupled in parallel with the series combination of the compensating leg and the second leg.

12. The heat-loss gauge of claim 11 wherein the measuring circuitry is configured to provide the respective measurement signals by measuring voltage (i) across the series combination of the sensor leg and the first leg and (ii) across one of the sublegs.

13. A method of temperature compensating a heat-loss gauge, comprising:
   measuring a voltage across (i) a sensor leg, (ii) a sensor leg and a temperature compensating leg coupled together in series, or (iii) a sensor leg and a fixed resistive leg coupled together in series, and providing a respective measurement signal therefrom;
   measuring a voltage across a subleg of the temperature compensating leg, and providing a respective measurement signal therefrom; and
   receiving the respective measurement signals and combining the measurement signals to produce a temperature independent pressure measurement.

14. The method of claim 13 wherein combining the measured voltages produces temperature independent pressure measurements over a pressure range.

15. The method of claim 14 wherein combining the measured voltages comprises using three-dimensional curve-fitting techniques to produce temperature independent pressure measurements over a pressure range.

16. The method of claim 13 wherein the temperature compensating leg comprises a temperature sensitive subleg and a temperature stable subleg.

17. The method of claim 16 wherein the temperature sensitive subleg comprises a temperature sensitive resistive element.

18. The method of claim 17 wherein the temperature sensitive resistive element is a temperature sensitive coiled resistor.

19. The method of claim 17 wherein the temperature sensitive subleg further comprises one or more temperature stable resistive elements coupled in parallel with the temperature sensitive resistive element.

20. The method of claim 17 wherein the temperature stable subleg comprises one or more temperature stable resistive elements coupled together in parallel.

21. A heat-loss gauge for measuring gas pressure in an environment, comprising:
   an electrical source;
   a switch;
   a first circuit comprising:
      a temperature stable differential resistance connected in series to a temperature compensating element, the series combination of the temperature stable differential resistance and the temperature compensating element being coupled to the switch, the temperature compensating element being exposed to the environment;
   a second circuit comprising:
      a temperature sensing element coupled to the switch, the temperature sensing element being exposed to the environment;
   the switch being connected to the electrical source to switch current between the first and the second circuits; and
   measuring circuitry configured to measure the resulting voltage required so a resistance of the first circuit matches a resistance of the second circuit;
   the resulting voltage providing a measurement signal; and
   processing circuitry receiving the measurement signal from the measuring circuitry, and being configured to produce temperature independent pressure measurement from the measurement signal.

22. The heat loss gauge of claim 21, wherein the electrical source applies current over a longer duty cycle to the second circuit relative to the first circuit.

23. The heat loss gauge of claim 21, wherein the processing circuitry receives the measurement signal and uses three-dimensional curve-fitting techniques to produce temperature independent pressure measurements over a pressure range.

24. The heat loss gauge of claim 21, wherein the measuring circuitry is configured to measure a voltage across the temperature compensating element, and wherein the measuring circuitry is configured to measure a voltage across the temperature sensing element to combine the measured voltages to provide the measurement signal, which is received by the processing circuitry.

25. The heat loss gauge of claim 24, wherein the measurement signal produces temperature independent pressure measurements over a pressure range.

* * * * *